Nov. 10, 1970   V. A. BENNING   3,538,742
FRICTION MEASUREMENT

Filed Oct. 14, 1968   4 Sheets-Sheet 1

Inventor
Vernon Arthur Benning
By
Kenyon, Palmer & Estabrook
Attorneys

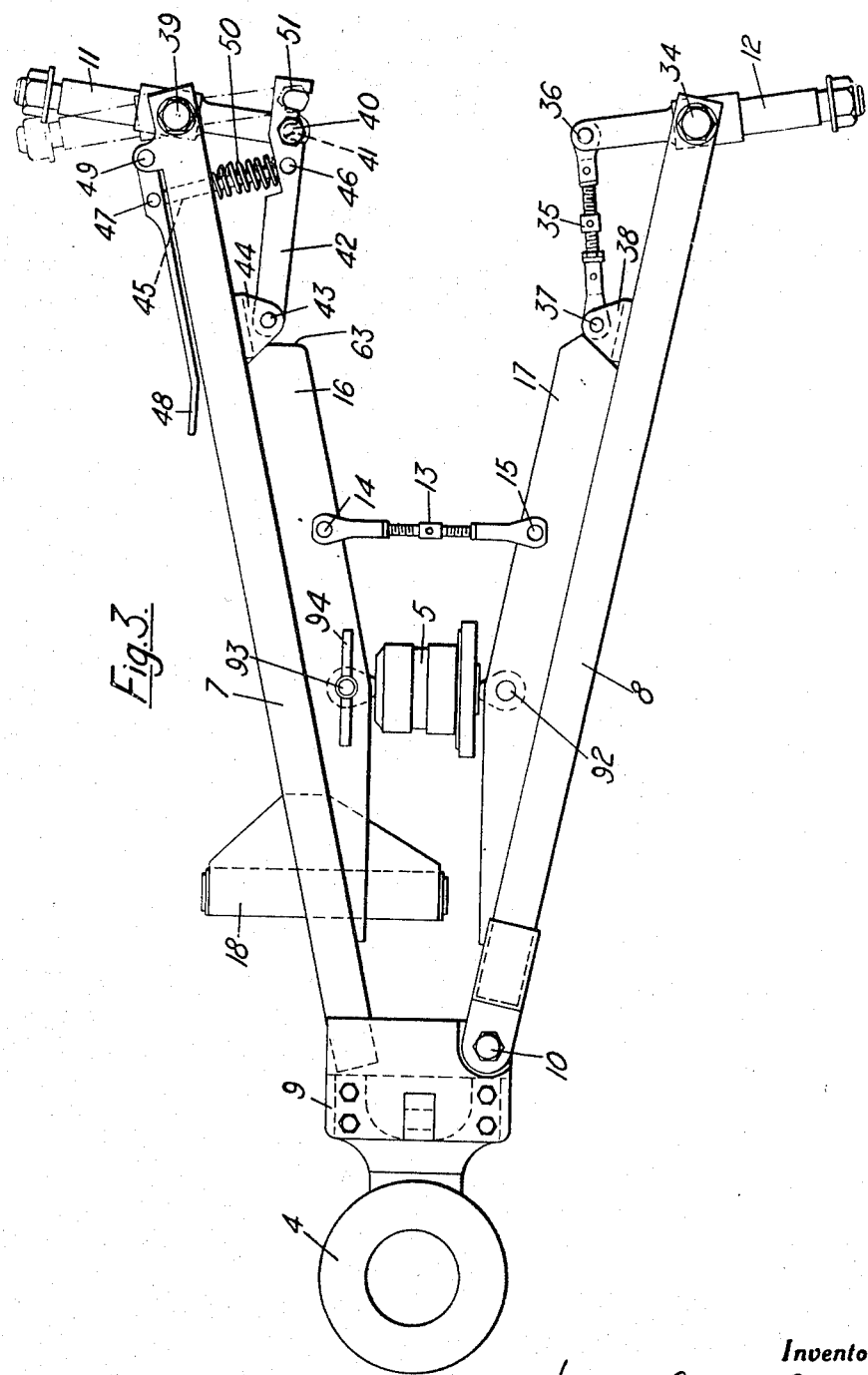

Nov. 10, 1970 V. A. BENNING 3,538,742
FRICTION MEASUREMENT
Filed Oct. 14, 1968 4 Sheets-Sheet 3

Inventor
Vernon Arthur Benning
By
Kenyon, Palmer & Estabrook
Attorneys

Nov. 10, 1970 V. A. BENNING 3,538,742
FRICTION MEASUREMENT
Filed Oct. 14, 1968 4 Sheets-Sheet 4

Inventor
Vernon Arthur Benning
By
Kenyon, Palmer & Estabrook
Attorneys

United States Patent Office 3,538,742
Patented Nov. 10, 1970

1

3,538,742
FRICTION MEASUREMENT
Vernon A. Benning, Slough, England, assignor to M. L.
Aviation Company Limited, Slough, England, a British
company
Filed Oct. 14, 1968, Ser. No. 767,446
Claims priority, application Great Britain, Nov. 9, 1967,
51,119/67
Int. Cl. G01n 19/02
U.S. Cl. 73—9
10 Claims

ABSTRACT OF THE DISCLOSURE

A vehicle for use in determining the coefficient of friction between a vehicle wheel and a surface includes a pair of supporting wheels rotatably mounted so as to have either a "toe-out" or a "toe-in." Accordingly when the vehicle is moved on the wheels over a surface, a force is produced tending to move the wheels relatively to one another in a generally axial direction. The vehicle includes a force measuring device for measuring this force which is dependent on the coefficient of friction between the wheels and the surface.

---

Figure 1:
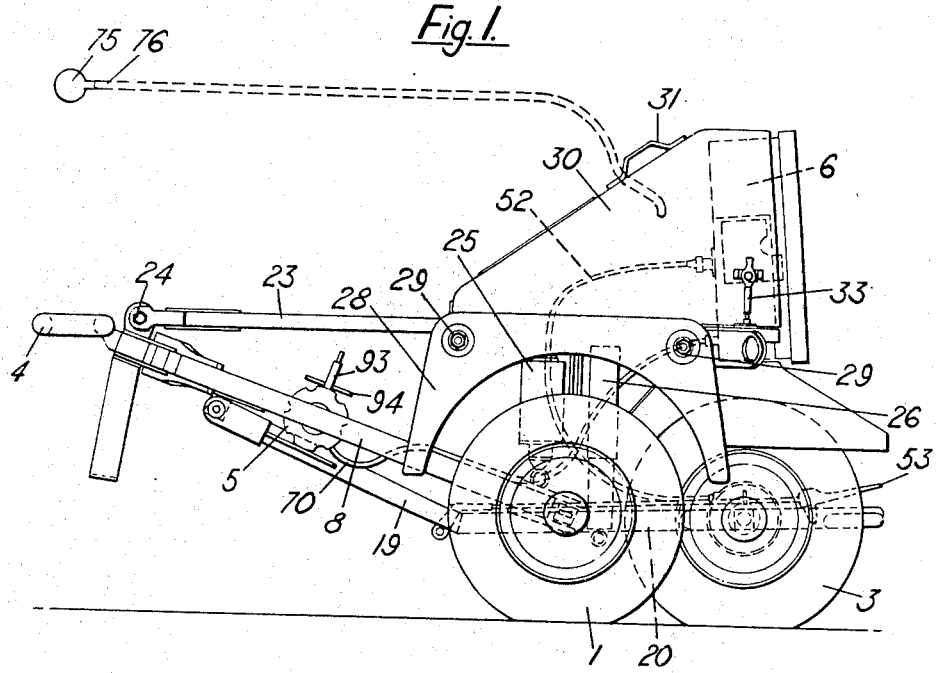

This invention relates to the measurement of the coefficient of friction between a vehicle wheel and a surface, in particular that between pneumatic tyres and the surfaces of aircraft runways and roads. This depends on the prevailing weather conditions and accordingly varies considerably. Accurate information concerning the actual value is of considerable use to the pilot of an aircraft when landing as it enables the maximum brake application to be used consistent with the avoidance of skidding. Such information is also of use in evaluating new road surfaces.

According to the present invention vehicle for use in determining this includes a pair of supporting wheels rotatably mounted about respective axes lying in vertical planes which are not parallel so that when the vehicle moves on the supporting wheels over a surface, a force is produced tending to move the supporting wheels relatively to one another in a generally axial direction, and a force measuring device arranged to measure the said force and therefore the frictional force exerted on the supporting wheels by the surface. The supporting wheels can be regarded as non-aligned, having either a "toe-out" or a "toe-in" depending on the intended direction of movement of the vehicle. In the former case the force which is measured by the force measuring device when the vehicle is moved is tensile since the lateral frictional force exerted on and resisted by the device tends to cause the wheels to diverge while in the latter case it is compressive since the frictional force tends to cause the wheels to become closer. In general, the frictional force is found to be independent of the speed at which the vehicle is moved over the surface.

In whichever manner the vehicle is designed to operate, the frictional force exerted on the wheels by the surface and thus the force which is measured is related to the coefficient of friction between the wheels and the surface. Accordingly, if desired, the force measuring device may be calibrated to indicate this directly. In the case of an aircraft runway, this information, which is obtained by moving the vehicle only once over the surface, can be radioed to the pilot of an approaching aircraft so that he can control his landing accordingly.

Preferably the wheels of the vehicle are so mounted that the axial separation between them and the angle between the two vertical planes, that is to say the "toe-out" or "toe-in," remain substantially constant as the force measured by the force measuring device varies from zero to the maximum measurable force. This results in a linear relationship between the coefficient of friction and the frictional force produced. A convenient form of construction which may operate in this manner includes a framework having a towing point and two horizontally extending beams pivoted about the vertical relatively to one another adjacent the towing point. The force measuring device is connected between the beams which are each supported by one of the supporting wheels such that relative axial movement of the wheels, as tends to occur when the vehicle is moved which in this case is by towing it, tends to cause corresponding pivoting of the beams relative to one another. In accordance with the preferred manner of operation just noted, this pivoting movement is kept very small by the use of a force measuring device having a very small range of movement, for instance a load capsule.

As just indicated, the method of operation of the vehicle may be by towing it, for instance behind a power driven vehicle. Alternatively it may be motorised itself. In either case it preferably includes a third supporting wheel rotatably mounted on an axis substantially parallel to but horizontally displaced from a line intersecting the two points of contact between the two other supporting wheels and the surface. Such a wheel serves to stabilize the vehicle. It may also serve to operate a recorder for continuously recording on a length of recording medium, for instance a chart, the instantaneous frictional force. In this case the recorder may have a recording element operated by the force measuring device, and mechanism connected so as to be driven by rotation of the third supporting wheel for causing corresponding relative movement between the recording medium and the recording element. Such a vehicle provides a record of the frictional characteristics of the entire length of the surface examined by it, for instance an aircraft runway.

Figure 2:
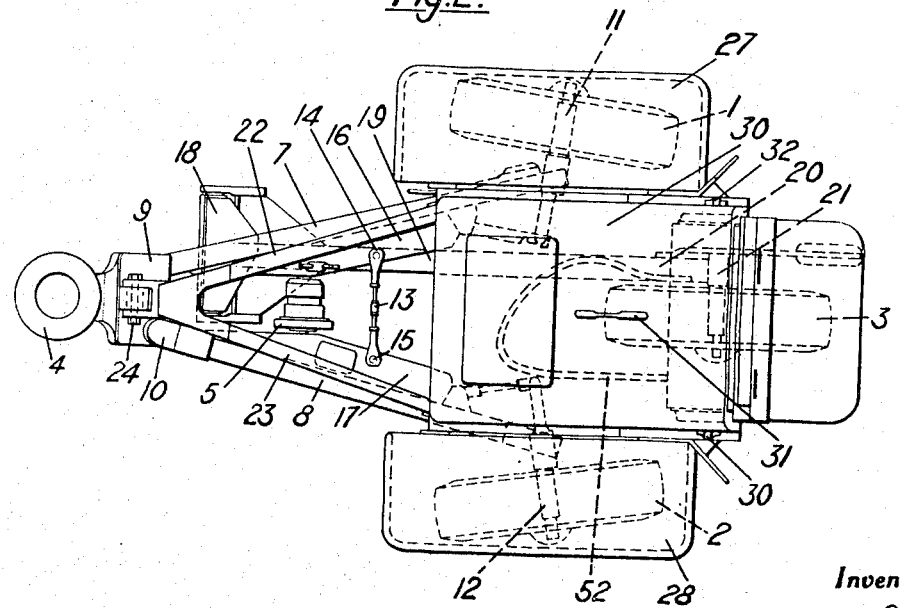
Figure 6:
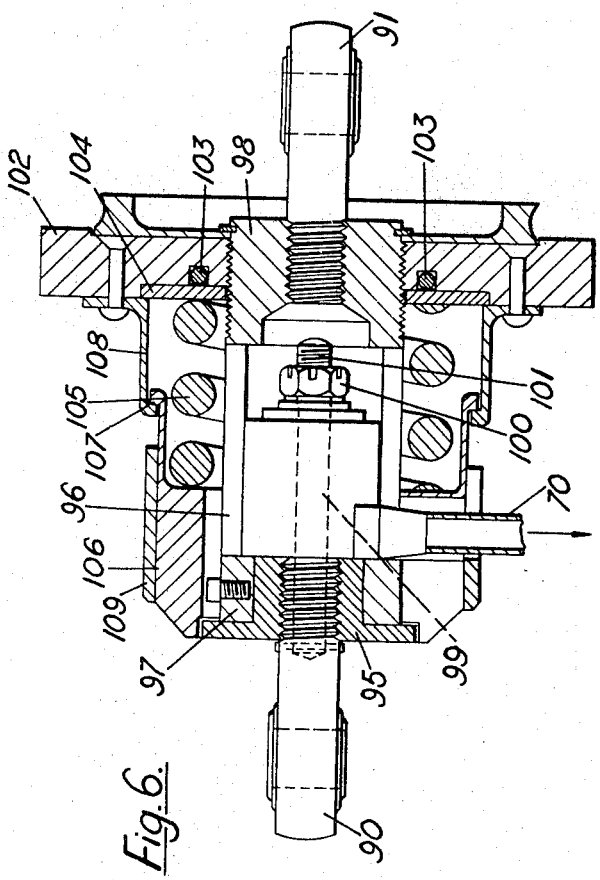
Figure 4:
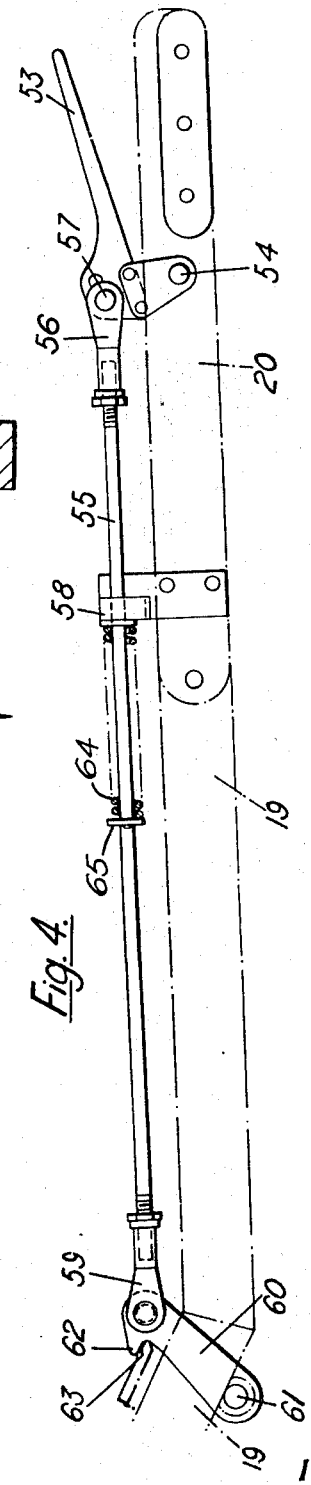
Figure 5:
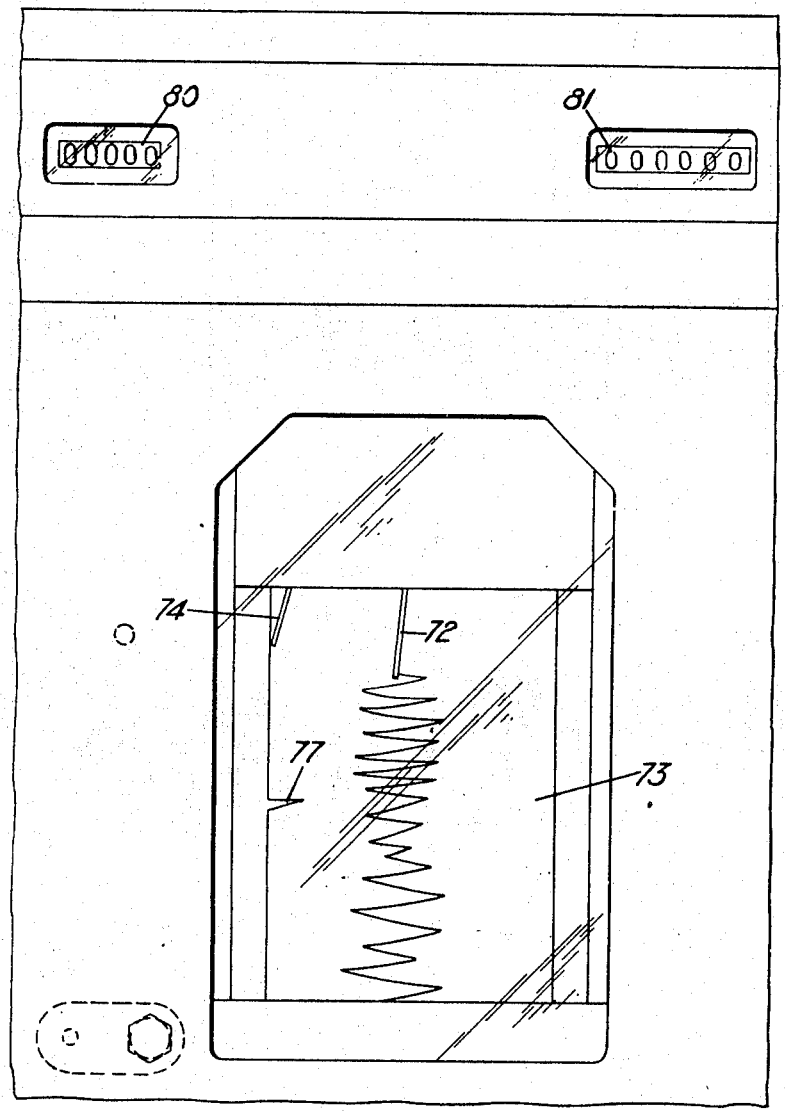
Figure 7:
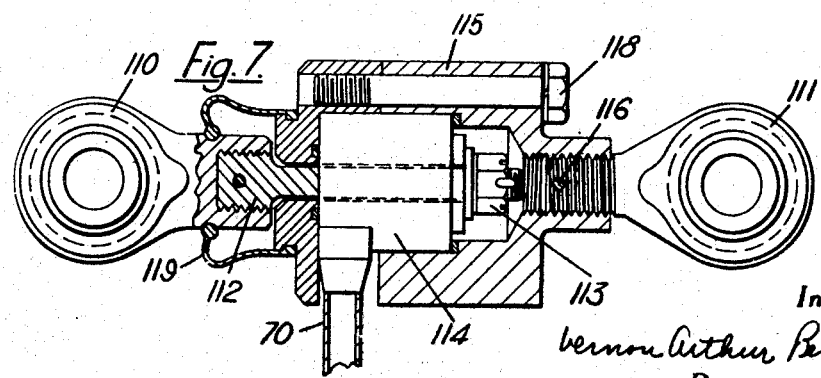

By way of example a vehicle in accordance with the invention will now be described in more detail with reference to the accompanying drawings in which:

FIG. 1 is a side elevation of the vehicle;
FIG. 2 is a plan view of the vehicle;
FIG. 3 is a plan view of part of the framework of the vehicle;
FIG. 4 is a side elevation corresponding to FIG. 1 of part of the vehicle to an enlarged scale.
FIG. 5 is a view of the indicating face of the chart recorder incorporated in the vehicle;
FIG. 6 is a sectional view through a load capsule incorporated in the vehicle; and
FIG. 7 is a sectional view through an alternative form of load capsule.

The vehicle has an overall length of 60 inches, an overall width of 32 inches, and an overall height of 34 inches. Its total weight is 528 lbs. and it is capable of measuring coefficients of friction lying in the range of from zero to unity.

Reference should first be made to FIGS. 1 and 2 from which it can be seen that the vehicle is in the form of a three-wheeled vehicle having a pair of supporting wheels 1 and 2 and a third wheel 3, all of which are fitted with standard pneumatic tyres. The vehicle is provided with a towing eye 4 and in use is towed behind a suitable vehicle, for instance a Land Rover. As can be seen from FIG. 2, the wheels 1 and 2 have a "toe-out." Accordingly when the vehicle is being towed, these two wheels tend to diverge from one another. This action is resisted by a load capsule 5 which measures the force necessary to do this. The measured force controls the recording pen of a chart recorder 6 containing a chart on which the force is indicated as a measure of the coefficient of friction. The chart is moved past the recording pen by the rotation of the wheel 3. Accordingly a record is produced of the variations in the frictional force, that is the variation in the adhesion qualities of the surface, over the entire distance which is examined.

The construction of the vehicle will now be described in more detail. Still referring to FIGS. 1 and 2, it can be seen that the vehicle includes a framework having two generally horizontally extending beams 7 and 8. The beam 7 is secured at one end to a member 9 to which the towing eye 4 is secured. The beam 8 is pivoted about a generally vertical axis to the member 9 at 10. The other ends of the two beams 7 and 8 carry axles 11 and 12, as will be described in more detail later, on which the wheels 1 and 2 are rotatably journalled. As shown in FIG. 2, each axle is inclined at an angle of 7°48' to a line normal to the longitudinal axis of the vehicle. Thus the wheels are non-aligned by an angle of 15°36'. A turnbuckle 13 is loosely secured at 14 and 15 to flanges 16 and 17 of the two beams 7 and 8 respectively and prevents excess pivoting of the two beams relatively to one another. The load capsule 5 is also secured to these flanges 16 and 17.

A bracket 18 is secured to the beam 7. A beam 19 is pivoted about a horizontal axis to the bracket 18 and, as can be seen from FIG. 1, includes an extension 20. A hub 21 is secured adjacent the end of the extension 20 and it is on this hub that the wheel 3 is rotatably journalled.

The chart recorder 6 and other parts of the vehicle including the necessary ballast, are carried by a V shaped member having arms 22 and 23 and pivoted about a horizontal axis at 24 to the member 9. The two arms 22 and 23 are secured to a platform (not visible) which is supported by two damped spring suspension devices, one of which is visible at 25. The upper ends of the devices are connected to the platform while the lower end of each is respectively connected to one of the beams 7 and 8. A low-rate spring assembly 26 is also secured to the platform and at its lower end is secured to the beam extension 20. Mud-guards 27 and 28 in the form of castings to provide the necessary ballast are secured by bolts visible at 29 to opposite sides of the platform above the wheels 1 and 2. A casing 30 having a handle 31 covers the platform and also the chart recorder 6. It is held in place by spring catches 32 and 33.

Reference should now be made to FIG. 3 in which the two axles 11 and 12 are visible. The latter is pivoted about a king-pin 34 to the end of the beam 8. A turnbuckle 35 is pivoted at 36 to the inner end of the axle 12 and at 37 to a bracket 38 secured to the beam 8. Adjustment of the turnbuckle 35 pivots the axle 12 about the point 34 and thus adjusts the "toe-out" angle.

The axle 11 is pivoted about a king-pin 39 to the end of the beam 7. A bolt 40 is tapped into the inner end of the axle 11 such that the head of the bolt is spaced away from the axle by part of the shank. As shown the shank of the bolt engages with a recess 41 in an arm 42 which is pivoted about a vertical axis 43 to a bracket 44 secured to the beam 7. A pin 45 is pivoted to the arm 42 at 46 and, after extending freely through a hole through the beam 7, is pivoted at 47 to a lever 48 which is pivoted to the beam at 49. A compression spring 50 surrounds the pin 45 and acts between the beam 7 and the arm 42. This spring restrains the recess 41 in engagement with the bolt 40. If the lever 48 is pivoted clockwise about the point 49, the pin 45 pulls the arm 42 pivoting it about the point 43 so that the bolt 40 and the recess 41 become disengaged. This enables the axle 11 to be pivoted about the king-pin 39 to a position in which, when the lever 48 is released, the bolt 40 engages with a second recess 51 in the arm 42. When the axle is in this position, which is illustrated in outline, the two axles 11 and 12 are parallel to one another; in other words there is no "toe-out." Accordingly the vehicle can be towed without wear on the tyres such as occurs when it is in use. Naturally the vehicle does not follow directly behind the towing vehicle when it is being towed in this way due to the non-alignment of the wheels with the fore and aft axis. This is unimportant since the towing eye 4 is designed to permit towing in this way.

As previously mentioned, the chart in the chart recorder 6 is moved past the recording pen by the rotation of the wheel 3. A worm gear (not shown) is secured to the wheel 3 so as to rotate with it and engages with a gear connected to a flexible drive cable 52 visible in FIGS. 1 and 2. In this way, the rotation of the wheel 3 is transmitted to the chart recorder 6 where it rotates one of two spools carrying the chart in the conventional manner. When the vehicle is not in use, it is desirable that a record should not be produced on the chart. For this reason, the beam extension 20 carries a lever 53 shown in FIG. 4 and pivoted about a pin 54 to the extension. A rod 55 carries an end-piece 56 pivoted to the lever at 57, extends through an aperture in a bracket 58 secured to the extension 20, and carries an end-piece 59 pivoted to a latch 60. The latter is pivoted to the beam 19 about a pin 61 and is formed with an undercut engaging edge 62. In the position shown, the edge 62 engages with the edge 63 of the bracket 16 shown in FIG. 3. This position is not illustrated but when in it, the beam 19 and its extension 20 and thus the wheel 3 are held in a position in which the wheel 3 is out of contact with the ground so that when the vehicle is towed the wheel 3 is not rotated and the chart recorder thus not operated. A compression spring 64 acts between a collar 65 secured to the rod 55 and the bracket 58 and has the effect of biasing the rod 55 to the left to retain the wheel out of contact with the ground. On depression of the lever 53, the latch 60 is pivoted to the right so that the two edges 62 and 63 become disengaged. The beam 19 and thus the extension 20 and the wheel 3 can then be lowered so that the wheel contacts the ground as illustrated.

A hydraulic tube 70 shown in FIG. 1 extends from the load capsule 5 to the chart recorder 6 and serves to transmit the load sensed by the capsule to the recorder where it is reproduced by the recording pen to produce the trace on the chart. The face of the recorder is shown in FIG. 5 in which the recording pen is indicated at 72. The chart 73 is moved vertically downwards past the recording pen 72 which assumes a horizontal position dependent on the load sensed by the load capsule 5. Since minor variations in the qualities of the surface are usually present, the trace produced by the pen 72 fluctuates as can be seen. However, the mean value is indicative of the mean coefficient of friction between the surface and the wheels of the vehicle.

A second recording pen 74 is provided and is operated by a manual control in the form of a compressible bulb 75 shown in FIG. 1 and connected to the chart recorder by a length of flexible tubing 76. When the bulb 75 is depressed, the resultant increase in pressure in it is transmitted along the tubing 76 to mechanism which in consequence causes the pen 74 to pivot to the right as shown in FIG. 4 to make a mark on the chart similar to that shown at 77. When the vehicle is in use, the bulb 75 is held by an operator in the towing vehicle. If he notices an unusual feature about the surface under examination, he can indicate this, and thus its position on the surface, on the chart 73 by squeezing the bulb 75 thus causing the pen 74 to make a mark similar to that shown at 77.

The chart recorder also includes an integrator having a five digit indicator 80 and a distance measuring device operated by the wheel 3 and having a six digit indicator 81. The integrator effectively summates the measured frictional force by adding together sample readings taken every twenty feet of surface traversed by the vehicle. The average value of the coefficient of friction is obtained by dividing the reading on the indicator 80 by the number of distance units given in feet on the indicator 81. It will be understood that the distance measuring device merely measures the distance travelled in accordance with the rotation of the wheel 3.

The load capsule shown in FIG. 6 will now be described. As previously explained, it is connected between the two brackets 16 and 17. For this purpose, it includes two eyes 90 and 91 through which pins 92 and 93 shown in FIG. 3 pass. The latter pin has a horizontally extending part 94 which is used for adjusting the load capsule as will be described later. The eye 90 is screwed into a block 95. A cage 96 has a part 97 which loosely surrounds the block 95 and a part 98 into which the eye 91 is screwed. A pressure sensitive capsule 99 connected to the hydraulic tube 70 is located within the cage 96 being held against the part 97 by a nut 100 screwed on to a screwed rod 101 secured to the eye 90. It can be seen from this that when a tensile force is applied between the eyes 90 and 91, the capsule 99 is compressed between the nut 100 and the part 97. In consequence, the pressure in the hydraulic tube 70 varies accordingly.

The load capsule is adjusted initially so that the chart recorder is correctly calibrated by means of an adjustment wheel 102, which acts as a zero adjustment, screwed on to the exterior of the part 98. Bearings 103 are carried in an annular recess in the face of the wheel 102 and support an annular plate 104. A compression spring 105 acts between this plate and a sleeve 106 which is accordingly biased to the left to a position in which its rightmost edge 107 is gripped by an inwardly extending edge of a sleeve 108 riveted to the wheel 102. A further sleeve 109 is riveted to the sleeve 106. To set the zero reading correctly, the wheel 102 is rotated when the eye 90 is disconnected from the bracket 16. To ensure that this is so, the pin 93 is used to rotate the wheel 102 which is provided with holes (not shown) around its perimeter into which the pin 93 can be inserted. The wheel 102 is rotated to compress the compression spring 105, the sleeve 108 moving to the left. An abutment on the inner surface of the sleeve 106 thus comes into contact with the block 95 and in consequence the capsule 96 is stressed. The wheel 102 is rotated until the chart recorder gives a predetermined reading of the force exerted on the capsule 96 corresponding to the correct zero adjustment. The vehicle is then ready for use.

The load capsule shown in FIG. 7 includes two eyes 110 and 111. The eye 110 is secured to a rod 112 screwthreaded at the right-hand end and carrying a bolt 113. A pressure sensitive capsule 114 similar to that shown in FIG. 6 is located between this bolt and one piece of a two-piece cage 115. The latter is screwed at 116 on to the shank of the eye 111. Accordingly when a tensile force is applied between the two eyes 110 and 111, the capsule 114 is compressed so that the pressure in the hydraulic tube 70 varies accordingly. Zero adjustment of the load capsule is by rotaation of a bolt 118 which varies the separation between the two pieces of the cage 115. A flexible cover 119 prevents ingress of dirt to the capsule 114.

It will be apparent from the preceding description that the load capsule, whichever construction is employed, has a very small range of movement, for instance 0.01 inch. Accordingly the separation between the wheels 1 and 2 remains effectively constant. In consequence the "toe-out" also remains constant. The purpose of the turnbuckle 13 is to prevent abnormal stresses being exerted on the load capsule. As already explained, it is a loose fit to ensure that it does not affect normal operation of the load capsule.

The vehicle just described may be used at speeds of up to 100 m.p.h. Tire pressures should generally be fairly low for good results, for instance 10 lb./in.$^2$ in the wheels 1 and 2 and 30 lb./in.$^2$ in the wheel 3.

I claim:
1. A vehicle for use in determining the coefficient of friction between a vehicle wheel and a surface including a framework, said framework comprising relatively displaceable side members, a pair of supporting wheels, means mounting each said wheel on a respective side member for rotation about respective axes lying in non-parallel planes whereby when said vehicle moves on said wheels over a surface, a force is produced tending to move said side members relatively to one another in a generally axial direction of the wheels, a force measuring device and means supporting said device between said side members whereby to measure said force and therefore the frictional force exerted on said wheels by said surface.

2. A vehicle according to claim 1 including a third supporting wheel rotatably mounted about an axis substantially parallel to but horizontally displaced from a line intersecting points of contact between said pair of supporting wheels and said surface.

3. A vehicle according to claim 2 including a recorder for continuously recording on a length of recording medium said frictional force, said recorder having a recording element operated by said force measuring device, and mechanism connected to be driven by rotation of said third supporting wheel for causing corresponding relative movement between said recording medium and said recording element.

4. A vehicle according to claim 3 including a second recording element having a manually operated control whereby a reference indication may be recorded on said recording medium.

5. A vehicle according to claim 3 including mechanism for holding said third supporting wheel out of contact with said surface whereby said recorder is rendered inoperative.

6. A vehicle according to claim 1 in which at least one of said pair of supporting wheels is pivotally mounted about a vertical axis, whereby said vertical planes can be rendered parallel to one another.

7. A vehicle for use in determining the coefficient of friction between a vehicle wheel and a surface, comprising a framework having a towing point and two horizontally extending beams pivoted about a vertical axis relatively to one another adjacent said towing point, a pair of supporting wheels respectively carried by said beams remote from said towing point and rotatably mounted about respective axes lying in non-parallel vertical planes, whereby when the vehicle moves on said wheels over a surface, a force is produced tending to move said wheels and thereby said beams relatively to one another in a generally axial direction, and a force measuring device connected between said beams for measuring said force and therefore the frictional force exerted on said wheels by said surface.

8. A vehicle according to claim 7 in which said force measuring device has a maximum range of movement of 0.02 inch whereby the axial separation between said pair of wheels and the angle between said vertical planes remain substantially constant as said force varies from zero to a maximum measurable value.

9. A vehicle according to claim 7 including a third horizontally extending beam pivoted about a horizontal axis adjacent said towing point and having an opposite end carrying a third supporting wheel rotatably mounted about an axis substantially parallel to but horizontally displaced from a line intersecting points of contact between said pair of supporting wheels and said surface.

10. A vehicle according to claim 9 including a recorder for continuously recording on a length of recording medium said frictional force, said recorder having a recording element operated by said force measuring device, and mechanism connected to be driven by rotation of said third supporting wheel for causing corresponding relative movement between said recording medium and said recording element.

References Cited

UNITED STATES PATENTS

| | | | |
|---|---|---|---|
| 1,890,218 | 12/1932 | Duby | 33—203.14 |
| 2,261,342 | 11/1941 | Darton | 33—203.14 |
| 2,700,297 | 1/1955 | Allen | 73—9 |

LOUIS R. PRINCE, Primary Examiner

W. A. HENRY II, Assistant Examiner